(12) United States Patent
Kniss et al.

(10) Patent No.: US 7,609,020 B2
(45) Date of Patent: Oct. 27, 2009

(54) GEOMETRIC END EFFECTOR SYSTEM

(75) Inventors: Jason M. Kniss, Garden City, MI (US); Michael J. Goff, Commerce Township, MI (US); Jerry Berendt, Brighton, MI (US); Ron Micallef, Shelby Township, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 296 days.

(21) Appl. No.: 11/821,188

(22) Filed: Jun. 23, 2007

(65) Prior Publication Data

US 2008/0012517 A1    Jan. 17, 2008

(51) Int. Cl.
*B25J 17/00* (2006.01)
(52) U.S. Cl. .................. 318/568.11; 901/15; 901/7; 901/28; 901/29; 901/30
(58) Field of Classification Search ............ 318/568.11; 901/15, 28, 29, 30, 7
See application file for complete search history.

(56) References Cited

U.S. PATENT DOCUMENTS

| | | | | |
|---|---|---|---|---|
| 4,809,425 | A * | 3/1989 | Monforte | 483/1 |
| 5,017,084 | A * | 5/1991 | Lemelson | 483/1 |
| 5,649,888 | A * | 7/1997 | Micale et al. | 483/11 |
| 6,116,845 | A * | 9/2000 | Wright et al. | 414/680 |
| 6,234,737 | B1 * | 5/2001 | Young et al. | 414/277 |
| 6,893,070 | B2 | 5/2005 | Baker | 294/86.4 |
| 7,089,717 | B2 * | 8/2006 | Guttinger et al. | 53/475 |
| 2003/0139645 | A1 * | 7/2003 | Adelman | 600/37 |
| 2007/0263492 | A1 * | 11/2007 | Lou et al. | 369/30.32 |

* cited by examiner

*Primary Examiner*—Rita Leykin
(74) *Attorney, Agent, or Firm*—Harness, Dickey & Pierce, P.L.C.

(57) ABSTRACT

A geometric end effector system for use on a robot. The system includes a platform and a frame secured to the platform. At least one base is arranged at a predetermined position on the frame. The system also has an anchor mount secured to the base and a component connected to an end of the anchor mount by a collar assembly. A key is arranged between the component and the anchor mount.

23 Claims, 8 Drawing Sheets

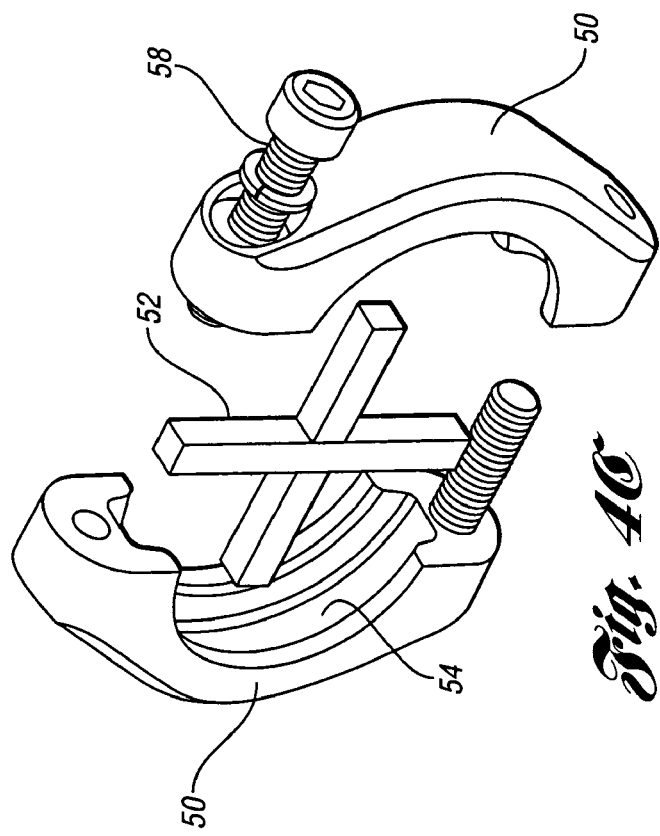
Fig. 4C
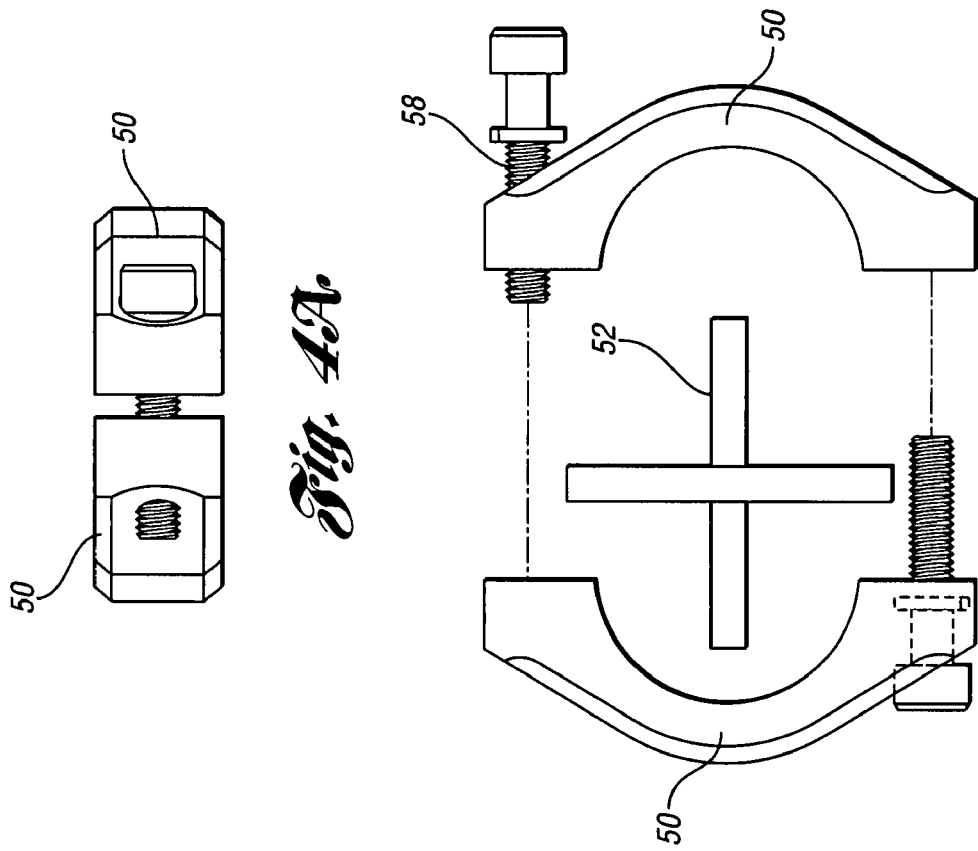
Fig. 4A
Fig. 4B

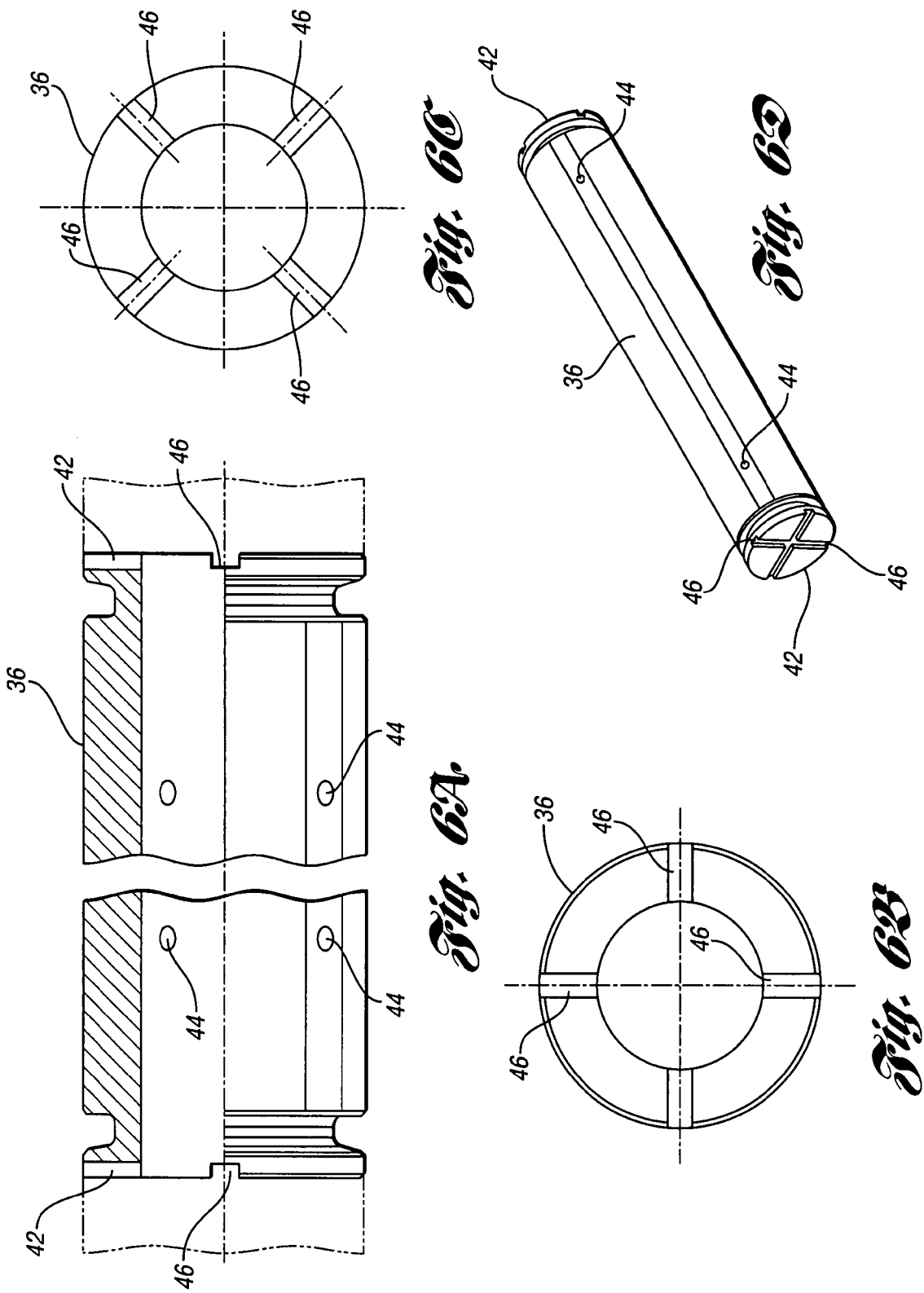

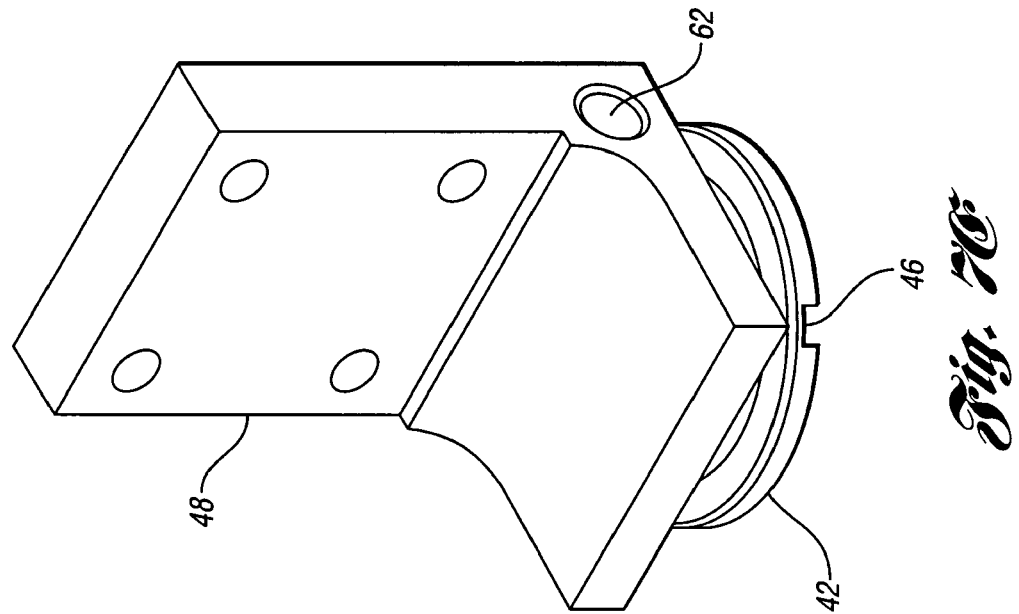
Fig. 7D
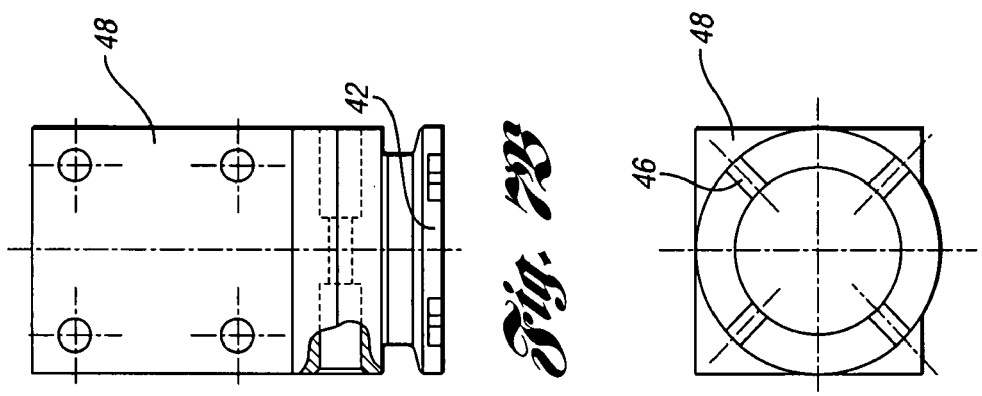
Fig. 7B          Fig. 7C
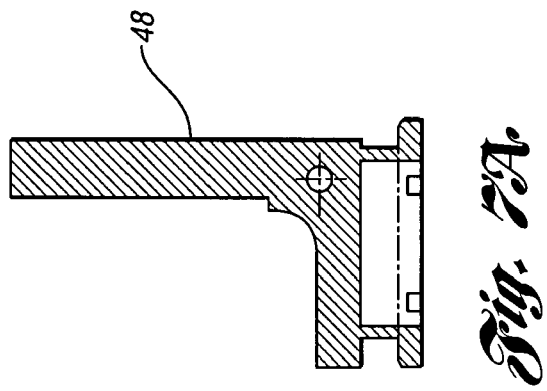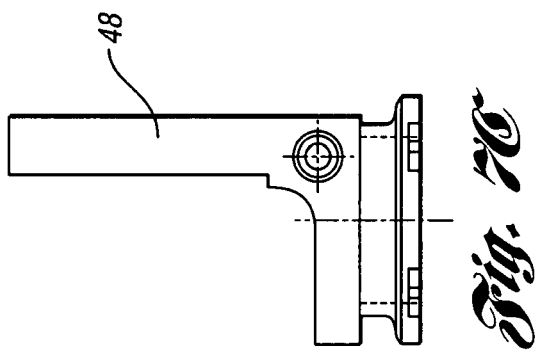
Fig. 7A          Fig. 7E

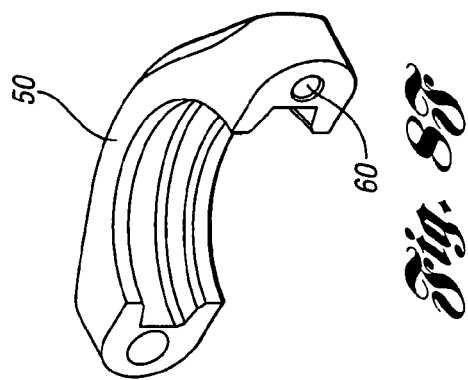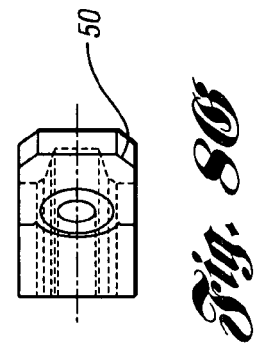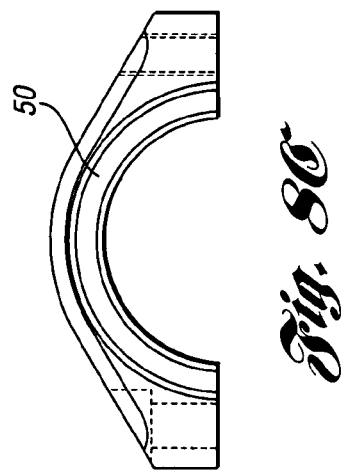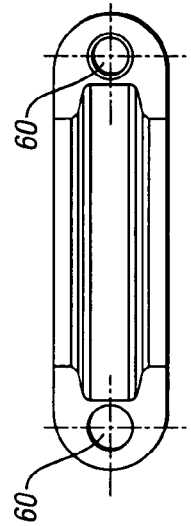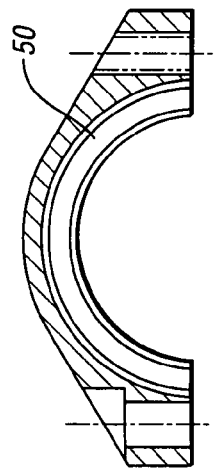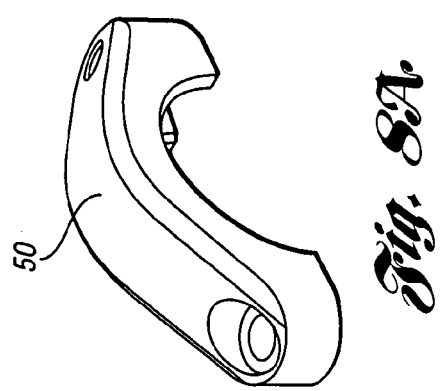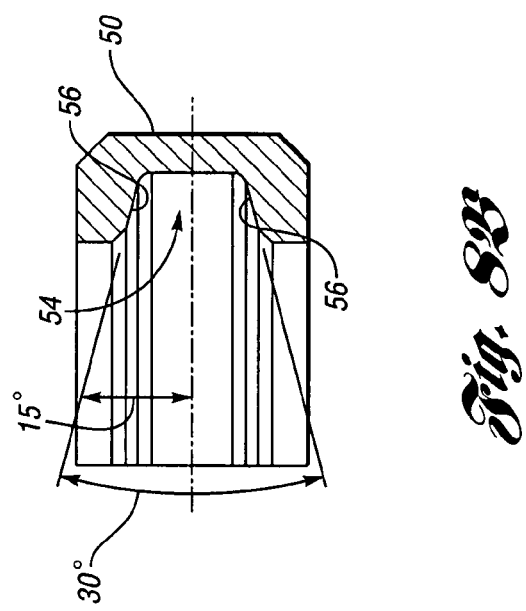

GEOMETRIC END EFFECTOR SYSTEM

BACKGROUND OF THE INVENTION

1. Field of the Invention

The present invention generally relates to robots and manufacturing systems and more particularly relates to a modular geometric end effector system for use with a robot.

2. Description of the Related Art

End effectors for use in assembly systems have been known in the prior art for many years. Generally, in many automated assembly systems, devices are used for holding and placing components and parts in a specified place so that a manufacturing, finishing or other intermediate step can be performed on the product being assembled or worked upon. These automated assembly systems generally employ many robots that minimize or eliminate the need for manual intervention, thus reducing the cost to the manufacturer of the labor and parts involved. The components used and made in such automated systems are typically made or moved by a robot via an arm or wrist all of which are well known methods in the prior art. Some of these methods may include having an end effector attached to the end of a robot arm and acquires a particular part. The end effector then either releases the part during the work or holds the part steady in a pre-specified position during the actual operation on the part. Other methods include using the robot arm or wrist to hold a tool to actually perform work on a part that is being held by other robots or other components in predetermined positions.

Many of these prior art robotic systems employ robotic cells that have a plurality of components which enables work pieces or materials to be lifted, transferred, lowered, or positioned either at a specific work station or successively from work station to work station via robotic mechanisms and the like. In these prior art assemblies many of these components connected in one robotic cell have to be precisely aligned with respect to work pieces being moved and/or held in position for work thereon. This requires down time of the manufacturing line to ensure effective alignment of the robotic components being held by such robots. Furthermore, many of these prior art robotic cell systems having multiple components may be bumped, misaligned, or contaminated by environmental hazards in the manufacturing environment which requests that the line be shut down so that components could be completely removed and replaced or repaired such that the robotic cell could begin work once again in the manufacturing environment. Therefore, the use of multi component robotic end effector assemblies in the prior art requires high maintenance and long down times to ensure exact positioning needed in the manufacturing environments found in many modern manufacturing settings. Furthermore, many of these prior art systems require multiple adjustments to parts holding the components such as clamps, pins or the like on the end of the end effectors to properly align them, thus increasing the down time of the manufacturing line and labor costs required to make such adjustments manually thereto.

Therefore, there is a need in the art for an improved modular geometric end effector system that would propose a cost effective method of replacing and repairing each component connected to a robotic cell on the end effector of a robotic arm, wrist or the like. There is also a need in the art for a geometric end effector system that will reduce production down time of the manufacturing line. There also is a need in the art for an improved geometric end effector system that will eliminate the need for the use of a second end effector, thus reducing manufacturing costs by reducing the number of robots necessary to operate a manufacturing line in an efficient and precise manner. There also is a need in the art for an improved end effector system that docks with a weld station or docking fixture to align and hold parts in a proper position during operation thereon and with respect to a predetermined point in the manufacturing plant.

SUMMARY OF THE INVENTION

One object of the present invention may be to provide an improved robotic end effector system.

Another object of the present invention may be to provide a modular geometric end effector system for use with robotic applications.

Yet a further object of the present invention may be to provide a robotic end effector system that reduces production down time and eliminates the need for multiple end effectors being used on manufacturing lines.

Still another object of the present invention may be to provide a modular geometric end effector system that is capable of mounting to standard platforms or application driven platforms known in the industry.

Still another object of the present invention may be to provide a geometric end effector system that is weld slag resistant to slag and other contaminates in the manufacturing environment.

Still another object of the present invention may be to provide a geometric end effector system including components that are constructed from high grade quality materials that offer high strength to weight ratios.

Still another object of the present invention may be to provide a geometric end effector system that has modular components that are easily configurable and provide for quick crash recovery and the like.

Still another object of the present invention may be to provide a modular geometric end effector system that has predictable collision break away points.

To achieve the foregoing objects a modular geometric end effector system according to the present invention is disclosed. The modular geometric end effector system includes a platform that is connected to a frame. The frame includes a plurality of bases arranged at predetermined positions on the frame. The geometric end effector system also includes an anchor mount secured to at least one of the bases via fasteners. A boom or other component is connected to the anchor mount via a collar assembly. A cross key is arranged between the boom and anchor mount to ensure no rotation occurs between the parts after connection therebetewen by the collar assembly. The anchor mount will have a pre-stressed region adjacent to a flange. The flange also includes four grooves arranged at 90° intervals from one another. The cross key is arranged within the grooves of each flange on the component and anchor mount to ensure precise positioning of the components with respect to the frame.

One advantage of the present invention is that it may provide an improved modular geometric end effector system.

Still another advantage of the present invention is that it may reduce production down time of a manufacturing line.

Still another advantage of the present invention is that it may eliminate the need for a backup end effector system within a robotic cell on a manufacturing line.

Still another advantage of the present invention is that it may have predictable collision breakaway points for the components connected to the end effector system.

Still another advantage of the present invention is that it may provide an effector system that has modular components that are easily configurable and provide for quick recovery from crashes or other down time situations.

Still another advantage of the present invention is that it may provide a methodology of different platforms in robotic manufacturing lines.

Other objects, features and advantages of the present invention will become apparent from the subsequent description and the appended claims, taken in conjunction with the accompanying drawings.

BRIEF DESCRIPTION OF THE DRAWINGS

FIGS. 4A-C show a collar assembly with a key according to the present invention.

FIGS. 6A-D show a boom according to the present invention.

FIGS. 7A-E show an edge part having a short angle bracket according to the present invention.

FIGS. 8A-G show a collar assembly for use with the present invention.

DESCRIPTION OF THE EMBODIMENT(S)

Figure 1:
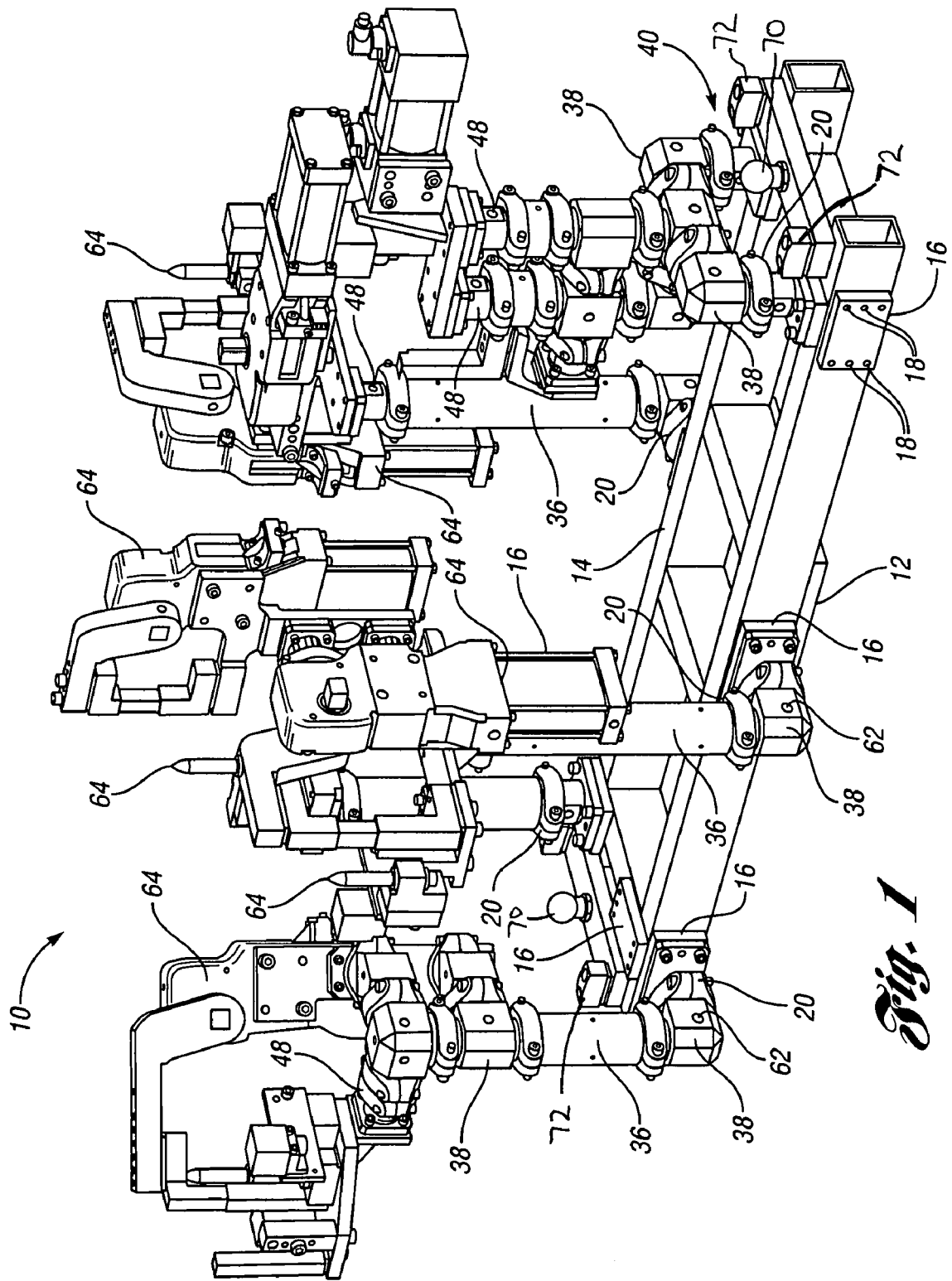
FIG. 1 shows a perspective view of a geometric end effector system according to the present invention.
Figure 2:
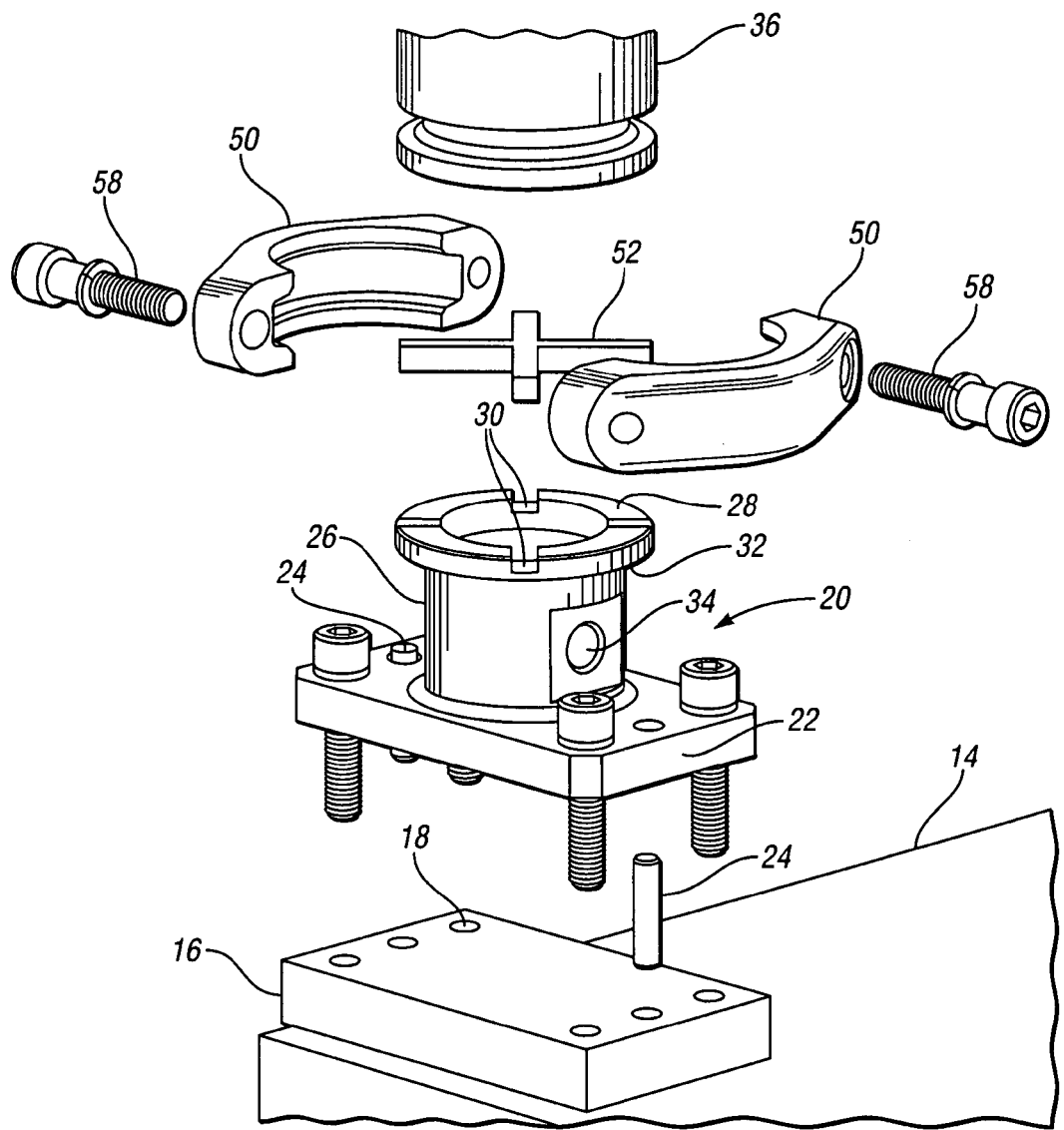
FIG. 2 shows an exploded view of the connection components according to the present invention.
Figure 3:
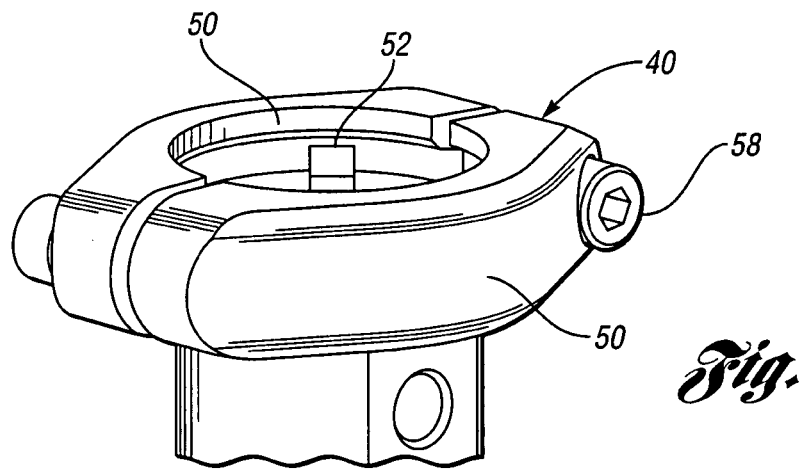
FIG. 3 shows a collar assembly according to the present invention connected to one component.
Figure 5C:
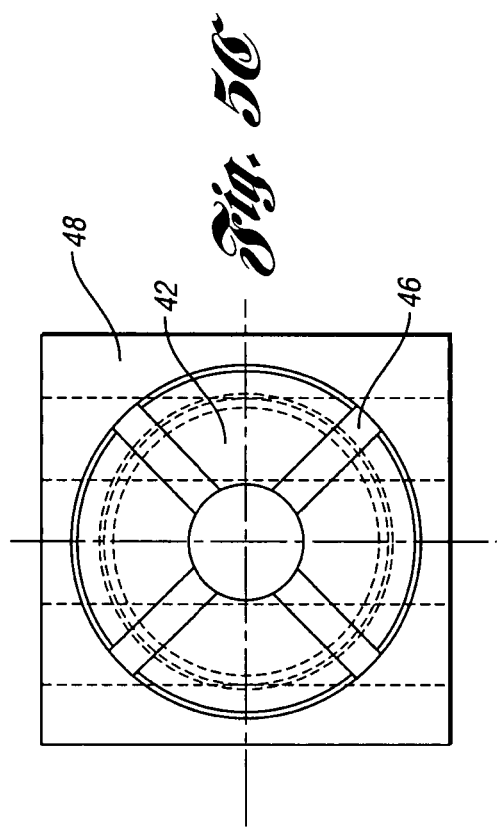
FIGS. 5A-D show a center modular straight junction according to the present invention.
Figure 5D:
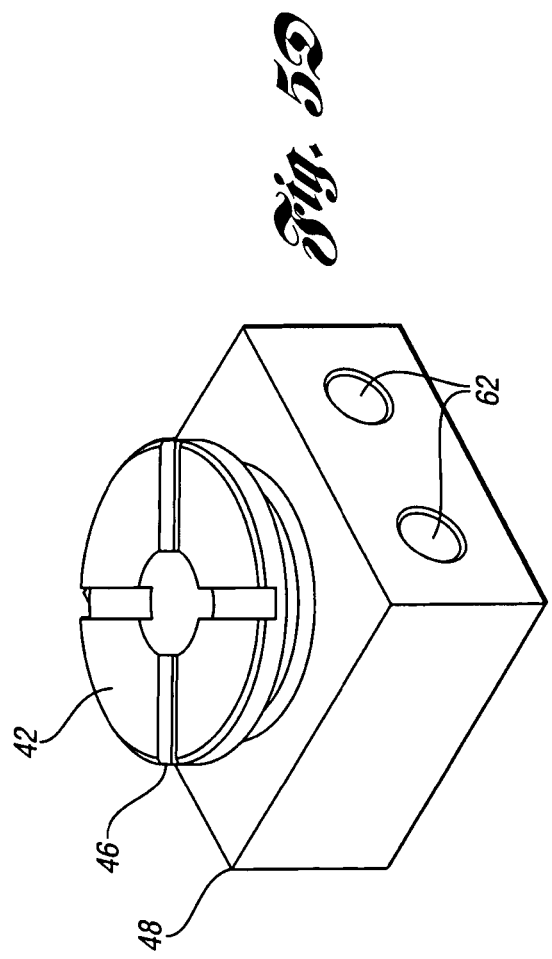
Figure 5A:
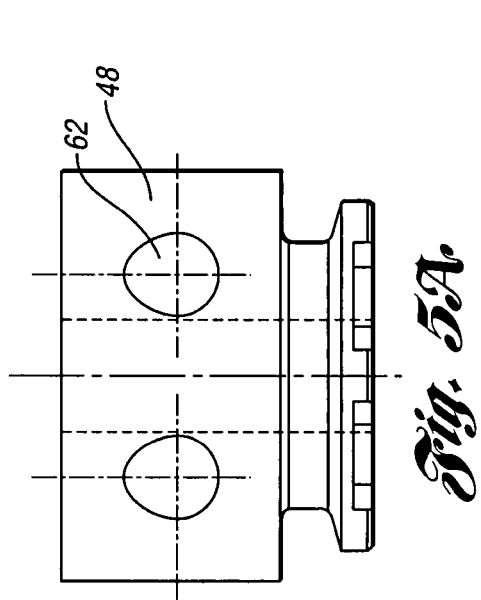
Figure 5B:
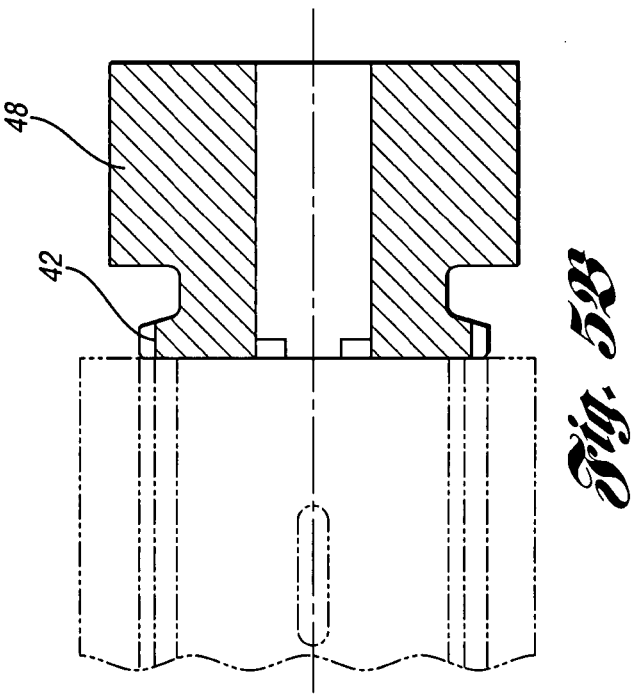

Referring to the drawings, a modular geometric end effector system 10 according to the present invention is shown. The geometric end effector system 10 is part of a robot that includes a robotic arm and a robotic wrist and/or other type of connection between a robot and the end effector system 10 that is used to work on a product or hold a product in the environment of the manufacturing robot. The geometric end effector system 10 is capable of being sized to connect to any known robot and it is also capable of being sized to pick up or hold any product that is being assembled or worked on in a robotic assembly line. In particular, the assembly may be used in an automobile manufacturing assembly line. It should be noted that the geometric end effector system 10 may be used to move a product or work piece being worked on from one position to another and then released. It should also be noted that the geometric end effector system 10 may be used to move a product and hold a product in a predetermined position while other robots or machines perform an operation on the product being held by the geometric end effector system 10. Any combination of moving, working on or holding in a predetermined position a work piece or product can be used with the geometric end effector system 10 of the present invention. After work being performed on the piece is complete, the geometric end effector system 10 can be used to move the product to another work station or to another storage area where another robot or human may perform work thereon.

FIGS. 1 through 9 show one contemplated embodiment of the geometric end effector system 10 according to the present invention. The end effector system 10 includes a platform 12 that is preferably made of steel, however it should be noted that any other type of metal, plastic, ceramic, or composite may be used for the platform 12. The platform 12 will have a variety of orifices therethrough to mate with any of the known robotic arms, robotic wrists or the like. The platform 12 may be of any known shape, such as a plate with the orifices therethrough, a circular, square, triangular, or any other shaped plate or any other type of platform known to connect to the end of a robot. The platform 12 is attached by any known fastening technique, i.e., chemical, mechanical or the like to a frame 14 which is preferably made of a steel material. However, it should be noted that the frame 14 may be made of any other known material such as any other known metal, plastic, ceramic, composite, natural material or the like. The frame 14 may have any known shape. The shape will depend on the environment in which the robotic cell will be used. The frame 14 will allow for a plurality of components to be connected thereto such that one robot arm may perform several functions or hold complex geometric parts for operations thereon or movement between stations in a manufacturing environment. Each frame 14 will have a plurality of base members 16 secured thereto. The base members 16 are secured to the frame 14 by any known mechanical or chemical bonding technique such as welding, fastening or the like. Each of the base members 16 will have a plurality of orifices 18 arranged at predetermined positions thereon. In the embodiment shown the orifices 18 are arranged along near or at each end thereof. Some of the orifices 18 may be threaded while some of the orifices may not be threaded. However, in some embodiments all orifices 18 may be threaded and in some other embodiments none of the orifices 18 are threaded. The base 16 generally has a rectangular shape with a predetermined thickness. In the embodiment shown three orifices 18 are arranged at or near each end of the base 16. It should be noted that any known shape can be used for the base members 16 depending on the design requirements and space available for the base members 16 on the frame 14. The base members 16 are generally made of a steel material, however it should be noted that any other metal, plastic, ceramic, composite or the like may be used for the base members 16 depending on the robotic cell and the environment such robot will be used in. The frame 20 may also include a locating ball 70 arranged at or near each end thereof. At least one stop pad 72 may also be arranged near the locating ball 70 on each end of the frame 20. In the embodiment shown, two stop pads 72 are arranged adjacent to each locating ball 70. The locating balls 70 may allow for the end effector system 10 to be properly and accurately aligned and held at a predetermined position within a docking fixture or weld stand within a robotic manufacturing line. The locating balls 70 will ensure that the workpiece being held by the system 10 is in an ideal position within the plant to be worked on by other robots, welders or the like to ensure extremely close tolerances and high quality produced parts.

Secured to the base member 16 is an anchor mount 20. It should be noted that the anchor mount 20 may be secured to all base members 16 on a robot end effector system frame 14 or on just selected base members 16 depending on the components to be connected to the frame 14 of the robot end effector system 10. The anchor mount 20 generally has a base 22 that mimics the shape of the base member 16. The anchor mount base 22 in the present embodiment generally has a rectangular shape with a predetermined thickness. A plurality of orifices 24 are arranged through the thickness of the anchor mount base 22 to align with and mate with the orifices 18 in the frame base member 16. Extending from generally a midpoint of the anchor mount base 22 on one side thereof is a cylindrically shaped member 26 extending therefrom. The cylindrical member 26 is fastened to the face of the anchor mount base 22 via any known fastening technique, such as welding or the like, or it is also contemplated to have cylindrical member 26 cast with the base 22 as one member, or made as an extrusion or machined. Arranged at an end of the cylindrical member 26 is a circumferential coupling flange 28. The flange 28 has a predetermined diameter with a predetermined sized bore or orifice through a midpoint thereof. A plurality of slots 30 are arranged on the end face of the coupling flange 28. The slots 30 extend a predetermined distance into the face of the flange 28. The slots 30 are arranged on the face such that any number of degrees are located between the slots 30. In the embodiment shown four slots 30 are positioned within the face of the flange 28. The slots 30 are arranged at 90° intervals around the ring like face of the flange 28. The anchor mount 20 is designed such that a breakaway point 32 occurs generally to where the flange 28 and cylindrical member 26 intersect. This intersectional point 32 between the flange 28 and cylindrical member 26 may be designed by either increasing or decreasing the thickness of the material used at the breakaway point 32 for the anchor mount 20. The reduction of material will create a breakaway point 32 that will fail at a lower force than that of a breakaway point 32 that has a thicker material cross section therethrough. Other methods of creating a breakaway point 32 are also contemplated such as scoring the intersection between the flange 28 and cylindrical member 26, pre-stressing, placing a plurality of notches there along, arranging a plurality of orifices therearound, using a different material, or any other contemplated and known method of creating a breakaway point 32 that will fail at a particular lower force in comparison to other components connected to the anchor mount 20 and within the end effector system 10. The breakaway point 32 will create a specific point at which a predetermined force will break the anchor mount 20 in relation to all other components connected to the anchor mount 20 between the robot and the components being held by the end effector system 10.

The anchor mount 20 may also include a calibration orifice 34 in a surface thereof which will allow for a tooling ball or the like measuring device to be inserted therein to ensure proper alignment and positioning of the anchor mount 20 with relation to the robot end effector frame 14. It should be noted that the anchor mount 20 is preferably made of a weld slag resistant aluminum material, specifically aluminum 7075-T6. However, it should be noted that any other metal, plastic, ceramic, composite, or natural material may also be used for the anchor mount 20 depending on the design requirements and environment in which the end effector system 10 will be used.

Figure 9B:
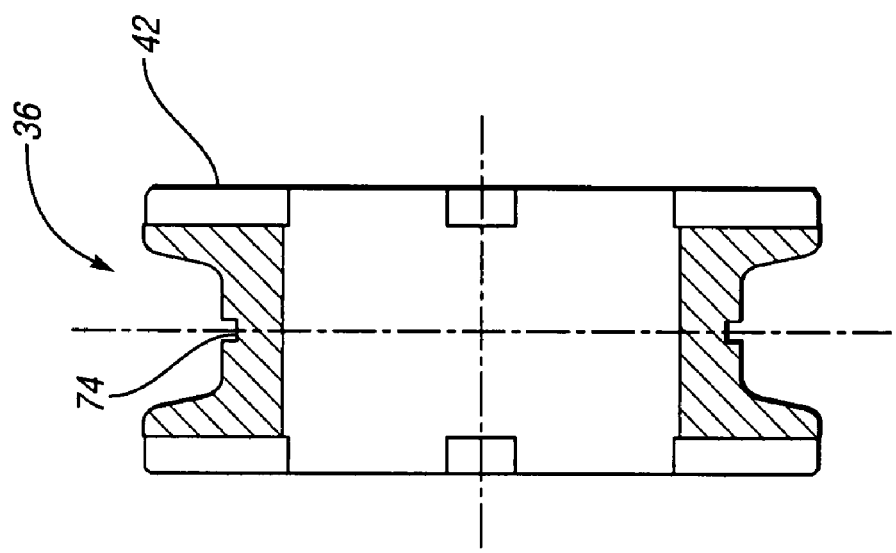
FIGS. 9A-B show an alternate embodiment of a boom according to the present invention.
Figure 9A:
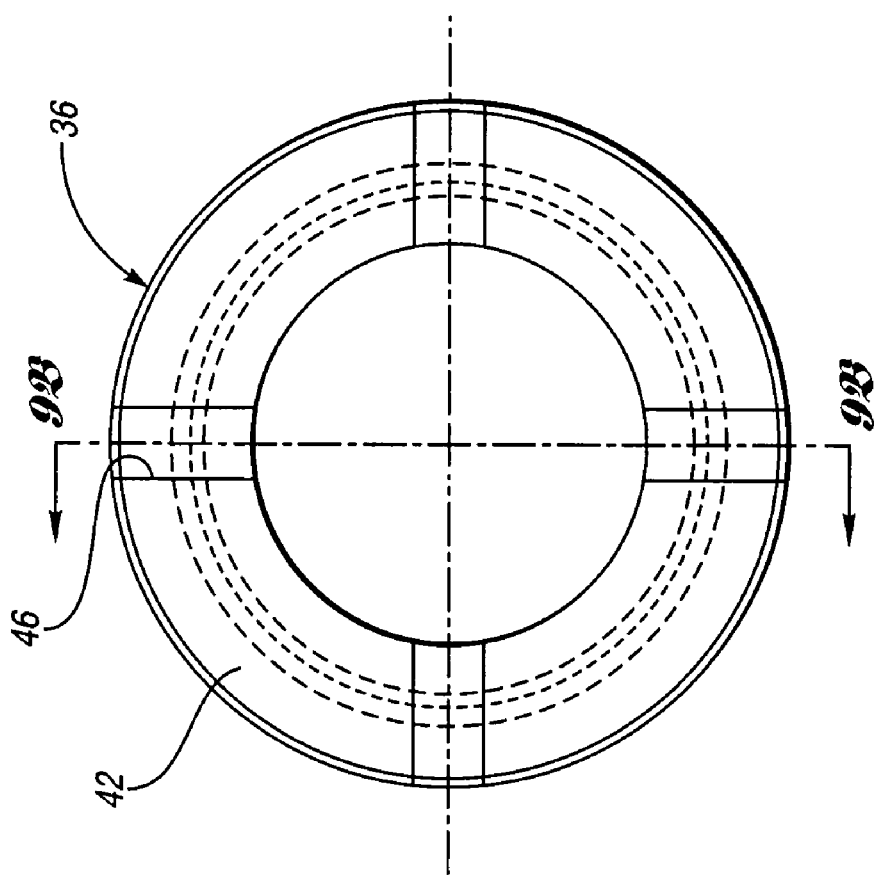

A boom 36 and/or junction member 38 may be secured to the anchor mount 20 via a collar assembly 40. The boom 36 which generally has a cylindrical shape with a bore through an entire longitudinal length thereof. The boom 36 will include a generally circular coupling flange 42 on both ends thereof. The boom 36 can be of any length or incremental length needed within the end effector system 10. The boom 36 will also include a plurality of orifices 44 prearranged at predetermined positions such that accessories may be mounted to the boom 36 or the booms 36 may be connected to components connected thereto or to an anchor mount 20 via a safety harness or the like. The orifices 44 are predetermined size and arranged at predetermined intervals along the boom 36 depending on the design requirements and the components being held. The coupling flange 42 located at each end of the boom 36 have a plurality of slots 46 therein to align with the slots 30 on the anchor mount 20, other junction members 38 or any other components. The slots 46 will have the same positioning around the end of the flange 42 and will have the same predetermined depth as that of the anchor mount flange 28. The boom 36 may have a predetermined thickness thus creating a part that will be able to absorb forces greater than that at the breakaway point 32 of the anchor mount 20. The junction members 38 generally will have at least one circumferential coupling flange 42 thereon but may have any number of coupling flanges 42 and faces thereon such as two face junction members, three face, four face, five face, and the like. These junction members 38 may allow for a connection to the anchor mount 20 at various angles, or with other various components connected thereto. Each of the faces of the junction members 38 will include a generally circumferential coupling flange 42 having slots 46 that are arranged in the same manner as those discussed for the anchor mount flange 28. Other edge accessory members 48 may also be connected to or used as an end member which connects to a clamp or other component being held by the end effector system 10. Generally, the edge accessory members 48 will have one circumferential coupling flange 42 arranged thereon but more than one may also be used. The flange 42 will include the same slots 46 arranged at the same intervals as those for the anchor mount flange 28. The edge accessory components 48 will be capable of holding parts at predetermined angles and/or straight as shown in FIG. 1. Another embodiment of the boom 36, as shown in FIG. 9A-B, includes a breakaway point 74 at a predetermined position thereon. The breakaway point 74 is similar to the breakaway point 32 of the anchor mount 20 as described above. Breakaway point 74 may be arranged at any position between the flanges 42 on each end of the boom 36. The boom 36 may be of any known length. The breakaway point 74 of the boom 36 will allow for a predetermined or known point of failure for the end effector system 10 alone or in combination with the breakaway point 32 of the anchor mount 20.

The boom 36, junction members 38, edge accessory members 48, other components and anchor mounts 20 are all interconnected with each other and fastened to one another in a multitude of combinations. The connections are created via a collar assembly 40. The collar assembly 40 includes a first and second collar member 50 and a cross key 52. The cross key 52 generally has an X-shape with a predetermined thickness. The predetermined thickness will be such that approximately half of the cross key 52 will extend into a slot 30, 46 on any of the coupling flanges 28, 42 while the other half of the cross key 52 will extend into an adjacent coupling flange 28, 42 of the other component being connected thereto The cross key 52 is arranged within all four of the slots 30, 46 and thus will secure the components being connected to one another such that no rotation can occur between the components after they are secured to one another with the collar assembly 40. The collar assembly 40 will include a first collar half 50 and a second collar half 50. The collar halves 50 will have a semi circular circumferential groove 54 arranged on an inner diameter thereof. The inner circumferential 54 groove will have a first and second angled surface 56 such that the groove 54 has a reduced radius as the groove 54 angled surface 56 extends into collar 50. In the embodiment shown, the angle of the surface 56 of the groove 54 is generally 15° from a centerline of the collar member 50. Therefore, a total angle of approximately 30° is found between the angled surfaces 56. However, it should be noted that any number of degrees can be used depending on the design requirements and holding force necessary for the collars 50. The first and second half collars 50 will be arranged around the outer circumferential surface of a first and second coupling flange 28, 42. Once the coupling flanges 28, 42 are arranged and align with one another via the slots 30, 46 therein, the collars 50 will be placed around the outer surfaces of the abutting coupling flanges 28, 42 and a first and second fastener 58 will be used to connect the first half collar 50 to the second half collar 50 via orifices 60 in both collars 50 that are opposite one another. This will allow for the two half collars 50 to be connected into one ring like collar around the outer circumference of the flanges 28, 42. In operation the fasteners 58 will be tightened such that the half collars 50 are urged towards one another until the flanges 28, 42 engage face to face with one another. Once the distance is the same on both sides of the collars 50, final tightening will be made until opposing faces of the two half collars 50 are engaged with one another thus creating a secure engagement between the two coupling flanges 28, 42 on opposing components in the end effector system 10. It should be noted that any type of fastener 58 may be used to connect the collars 50 and anchor mounts 20 to the respective adjoining components. In one embodiment an M8 bolt is used for all connections between components and the frame 14 of the robot end effector system 10. However, it should be noted that any other type of fastener may be used for the above mentioned end effector system 10. It should also be noted that all of the components described for the collar assembly 40, boom 36, junction components 38 and edge accessory components 48, except for the cross key 52 which is made of steel, are all made of the same aluminum material as that described above for the anchor mount 20. However, any other known metal, ceramic, plastic, composite or natural material may also be used for these components as described above.

Any of the junction members 38 or edge accessory components 48 along with other accessory mount components may include an orifice 62 therein for use in calibration of the system via tool balls or the like. These tool balls will be used to ensure accurate positioning and precision of any of the components connected to the geometric end effector system 10 and the components 64 being held. It should be noted that the tolerance achieved via the geometric end effector system 10 as described above may place the components being held such as clamps, tools or other components 64 within a tolerance range of zero to 0.01 millimeters for precise manufacturing lines. It should further be noted that the strength of the overall geometric end effector system 10 is in the components such as the booms 36, junction members 38, edge accessory members 48 and the like. These components generally are ten to 90 percent stronger than the joint at the breakaway point 32 of the anchor mount 20. This increased strength is due to many variables such as thickness of the components, material used, and shape of the components. It should further be noted that any shaped component may be used for the booms, junction members or edge accessories within the end effector system 10 according to the present invention. The shape may be square, triangle, octagonal, rectangular, or any other known shape for any of the components, not just those shown in the drawings. The drawings only show one contemplated embodiment of the geometric end effector system 10 according to the present invention.

In operation, the geometric end effector system 10 will have at least one anchor mount 20 secured to a base 16 that is secured to a frame 14 of a robotic cell on the end of a robot. The positioning of the anchor mounts 20 on the frame 14 will allow for a work piece to be held at a precise position during operation thereon or for movement of the work piece from one station to another by a robotic arm or the like. The precise positioning will occur via the connections between components connected to the anchor mount 20. It should be noted that any combination and order of components including but not limited to booms, junction members, edge accessory components, or any other accessory component may be connected in any known combination. These various configurations are then connected to an anchor mount 20 such that the tool or component being held at the end of the component system configuration is held in a precise position with relation to the frame 14 of the robot and hence, the piece being held or worked upon. The strength of the component system will be in the components not at the anchor mount 20 specifically the weak point will be at the breakaway point 32 located near the flange 28 and cylindrical member 26 end junction point. This will improve the safety and reduce the down time of the manufacturing line where the modular geometric end effector system 10 is used. In the case of an accident such as a collision with other machinery or the like, all of the force will be absorbed by the strength of the components such that any failure of the geometric end effector system 10 will occur at the breakaway point 32 located on the anchor mount 20 at the intersection of the coupling flange 28 and the cylindrical member 26. This will allow for any damage to mostly occur to the anchor mount 20. Then only the anchor mount 20 will need to be replaced to get the robot end effector system 10 operating again along with the manufacturing line. The replacement mount 20 is easily and quickly replaced by removing the collar 50 connecting the anchor mount 20 to the first component connected thereto, removing the fasteners 58 from the anchor mount 20 that are connected to the base 16, and then placing a new anchor mount 20 on the base 16 and fastening it down with fasteners 58 as described above and then reconnecting the collar 50 such that the new anchor mount 20 is secured to the first component as previously arranged. Therefore, down time of the manufacturing line is greatly reduced by having to change only one component instead of fixing multiple components or straightening clamps or components connected to the frame 14 of a robotic end effector as had to be done in the prior art. The use of the collar connector system 40 including the X-key 52 will allow for more precise connection of the components and the clamp or tool connected to the end of the last component. Furthermore, there will be no rotation between connected components and the anchor mount 20 connected to the frame 14. It should be noted that the material used including the connections between the frame 14 and the components, which generally are steel and aluminum, and all fasteners will be treated such that no rust will occur between components of different materials. This will increase the reliability of the geometric end effector system 10 in the manufacturing environment. It should also be noted that any other shaped key system may be used, in the embodiment shown an X-key system is used but a Y-shaped system or any other shape may also be used, to create the key system between components being connected within the geometric end effector system 10.

It should also be noted that conduit may be fixed between or to the plurality of orifices 44 in the components such as the booms 36, junction members 38, and anchor mounts 20 such that other components may be connected to it, such as but not limited to electrical systems run through it, pneumatic systems, liquid systems and the like may be used to connect to the tools, clamps, pins or the like being held at the end of the component system configurations arranged in the end effector system 10. It should also be noted that the present system is capable of being used with a robot, tool changer, etc, interface patterns may be designed to accommodate and be compatible with all known docking applications. The present system 10 can use automatic optical and standard CMM validation points, along with modular components to make an easy and configurable system that provides quick crash recovery on the manufacturing line thus reducing down time and increasing efficiency of people working on such manufacturing lines.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A geometric end effector system, said system including:
   a platform;
   a frame secured to said platform;
   a plurality of bases arranged at predetermined positions on said frame;
   an anchor mount secured to at least one of said bases;
   a component connected to said anchor mount by a collar assembly; and
   a key arranged between said component and said anchor mount.

2. The system of claim 1 wherein said key is a cross key that ensures no rotation occurs between said component and said anchor mount.

3. The system of claim 1 wherein said anchor mount having a breakaway point or region.

4. The system of claim 3 wherein said anchor mount having a flange with a plurality of grooves arranged at predetermined intervals from one another.

5. The system of claim 4 wherein said flange having four grooves with 90° intervals arranged therebetween.

6. The system of claim 4 wherein said breakaway region is arranged adjacent to said flange.

7. The system of claim 3 wherein said breakaway point generally occurs at an intersection of a flange and a cylindrical member of said anchor mount.

8. The system of claim 7 wherein said breakaway point is defined by a reduced thickness of material or any other known weakening methodology or technique at said intersection.

9. The system of claim 1 wherein said component is a boom or junction member.

10. The system of claim 9 further including accessory members secured to said boom, said junction member or said anchor mount.

11. The system of claim 1 wherein said collar assembly including a first and second collar half, said halves having a semi circular circumferential groove on an inner diameter thereof, said groove having a first and second angled surface, said angled surfaces will urge flanges of said anchor mount and said component into engagement with each other.

12. The system of claim 11 wherein each of said angled surfaces having an angle of approximately 15° from a centerline of said collar assembly.

13. The system of claim 9 wherein said boom having a breakaway point arranged at a predetermined position thereon.

14. The system of claim 1 further including at least one locating ball, said locating ball allows for the end effector system to be precisely aligned and held in a predetermined position.

15. An end effector or fixture system for use on a robot, said system including:
   a frame;
   at least one anchor mount secured to said frame, said anchor mount having a breakaway point that will fail when a predetermined force engages the end effector system allowing for quick recovery of the robot through replacement of said anchor mount;
   a component connected to said anchor mount by a collar assembly; and
   a key arranged between said component and said anchor mount.

16. The system of claim 15 further including a platform secured to said frame.

17. The system of claim 15 further including at least one base arranged at a predetermined position on said frame.

18. The system of claim 15 wherein said key is a cross key.

19. The system of claim 15 wherein said anchor mount having a flange and a cylindrical member, said flange having at least one groove, said key is arranged in said groove to rotatably fix said component with respect to said anchor mount.

20. The system of claim 15 wherein said component is a boom or junction member.

21. The system of claim 20 further including accessory members secured to said boom, said junction member, or said anchor mount.

22. The system of claim 21 wherein said junction member and said accessory member having an orifice and tool ball for calibrating the position of said members with respect to the end effector system.

23. A method of assembling a geometric end effector system for use on a robot, said method including the steps of:
   securing at least one breakaway anchor mount to a base, said base secured to a frame of the end effector system;
   fastening a boom or junction member to an end of said anchor mount with a collar assembly and a key;
   fastening an accessory member to an end of said boom or said junction member; and
   securing said frame to the robot.

* * * * *

UNITED STATES PATENT AND TRADEMARK OFFICE
CERTIFICATE OF CORRECTION

| | | |
|---|---|---|
| PATENT NO. | : 7,609,020 B2 | Page 1 of 1 |
| APPLICATION NO. | : 11/821188 | |
| DATED | : October 27, 2009 | |
| INVENTOR(S) | : Jason M. Kniss et al. | |

It is certified that error appears in the above-identified patent and that said Letters Patent is hereby corrected as shown below:

Title Page
Insert Item --[60] Related U.S. Application Data,

Provisional application No. 60/830,155, filed on Jul. 7, 2006--

Signed and Sealed this

Twenty-third Day of February, 2010

David J. Kappos
*Director of the United States Patent and Trademark Office*